US005376175A

United States Patent [19]

Long, Jr. et al.

[11] Patent Number: 5,376,175
[45] Date of Patent: Dec. 27, 1994

[54] METHOD AND MEANS FOR UNIFORMLY COATING PARTICULATE MATERIAL

[76] Inventors: Richard L. Long, Jr., 1512 Kentucky; Donald E. Barber, R.R. 4, both of Ames, Iowa 50010

[21] Appl. No.: 108,053

[22] Filed: Aug. 17, 1993

[51] Int. Cl.[5] .................... B05B 17/00

[52] U.S. Cl. .................... 118/303; 118/19; 427/212; 427/215; 427/242; 427/421; 366/54; 366/220

[58] Field of Search .................... 427/212, 215, 242, 421; 118/303, 19; 366/54, 220

[56] References Cited

U.S. PATENT DOCUMENTS

| | | | |
|---|---|---|---|
| 3,934,545 | 1/1976 | Schady | 118/303 |
| 4,064,831 | 12/1977 | Okawara | 118/303 |
| 4,688,514 | 8/1987 | Yamabayashi et al. | 118/19 |

*Primary Examiner*—Shrive Beck
*Assistant Examiner*—David M. Maiorana
*Attorney, Agent, or Firm*—Zarley, McKee, Thomte, Voorhees & Sease

[57] ABSTRACT

An apparatus is provided for uniformly coating particulate material. The apparatus includes a frame, a cylindrical drum rotatable about an axis tilted with respect to a horizontal plane, and a spray nozzle extending into the drum so as to spray a coating solution onto the particulate material tumbled within the rotating drum. Perforations in the side wall of the drum allow a flow of air through the drum so as to dry the material within the drum as it is coated with solution. A vacuum system removes the coated seeds from the drum without manual handling. In operation, the seeds form a dense mass, and migrate away from the mass as the seeds increase in size and weight from the sprayed coating. Eventually, all of the particles are uniformly coated, and thus a new mass is formed and the process repeated until the material reaches a desired size.

14 Claims, 3 Drawing Sheets

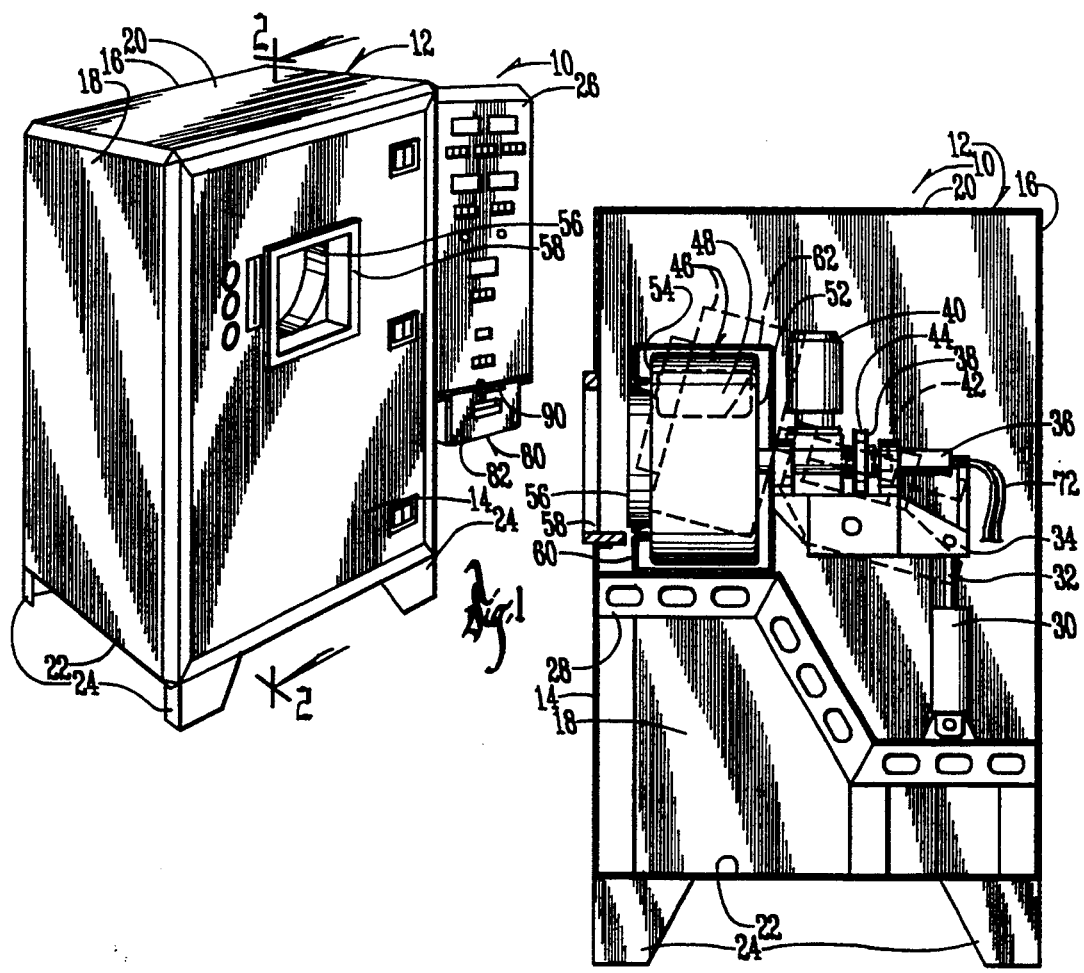
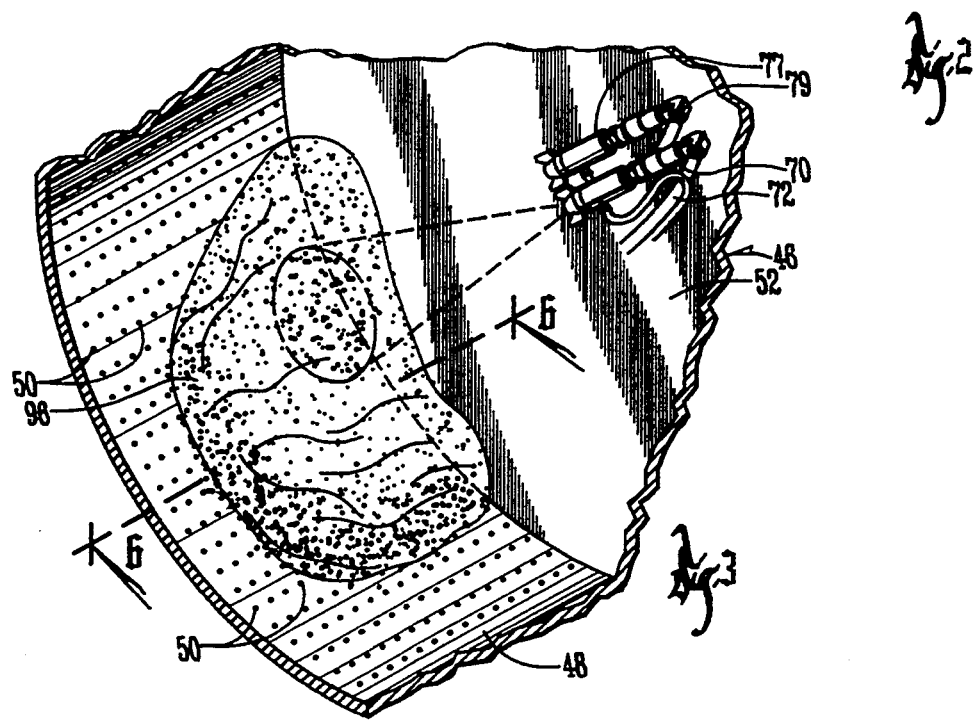

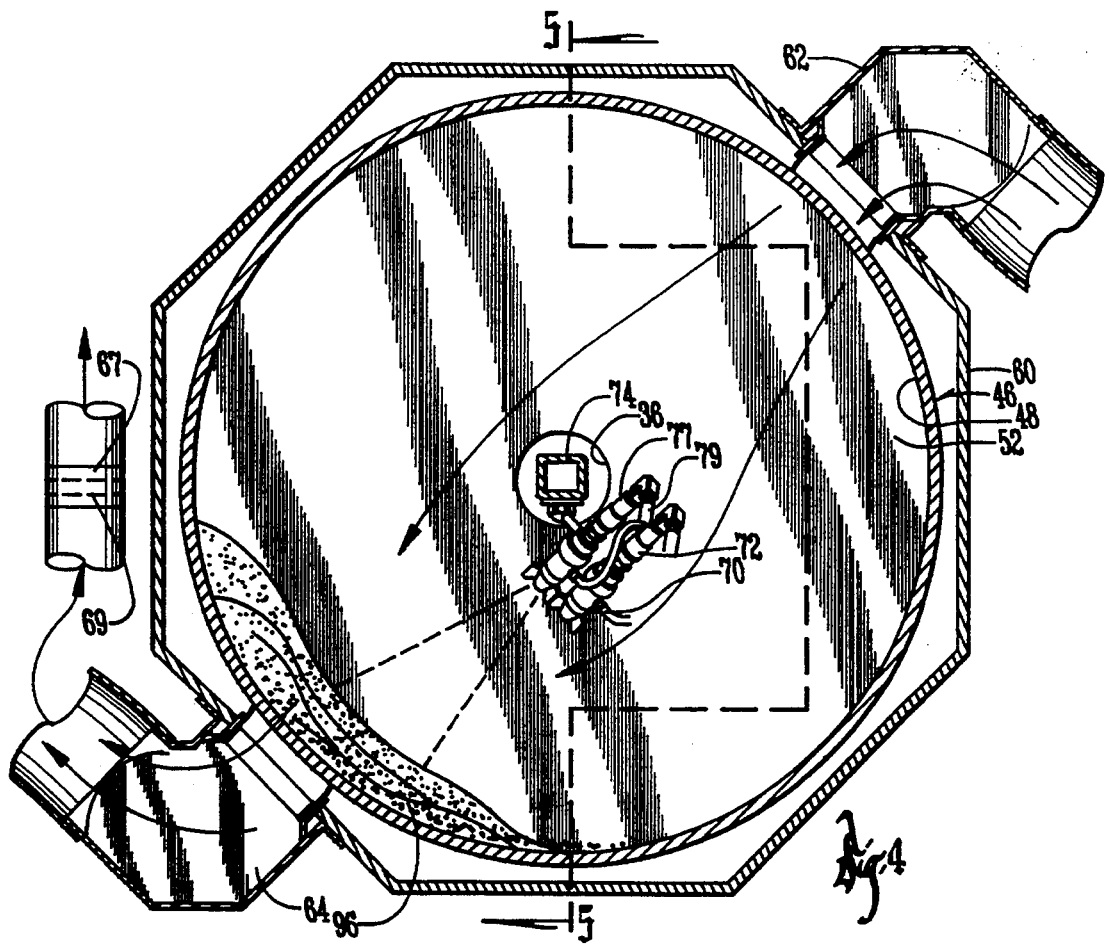
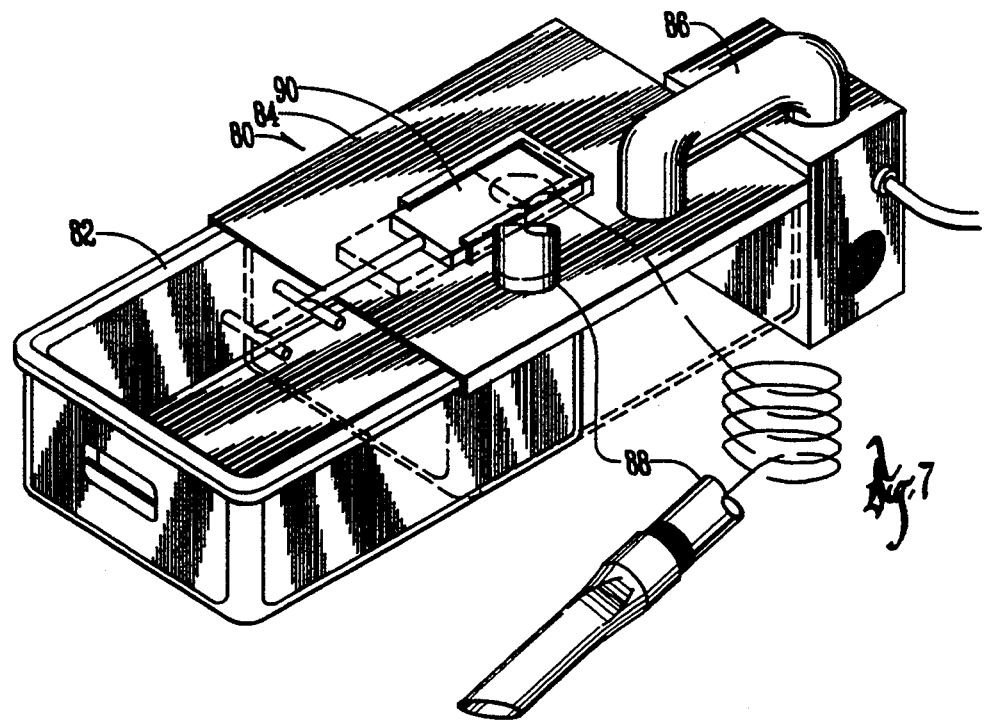

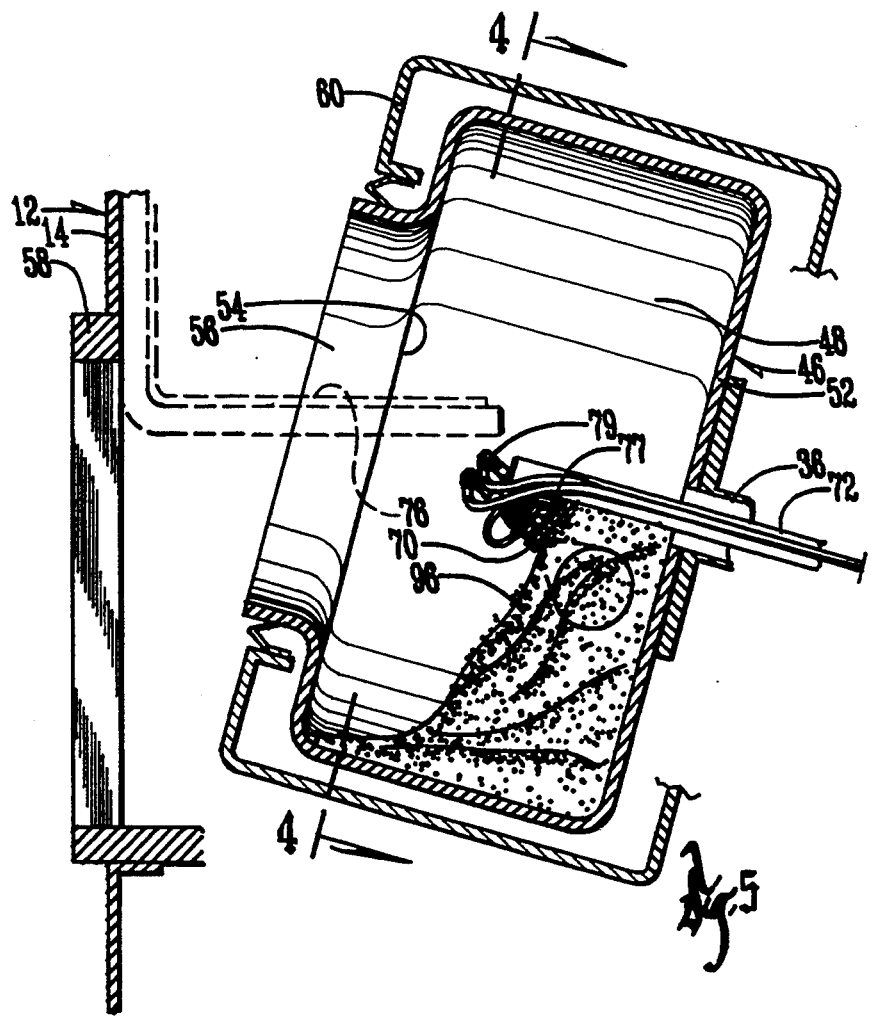
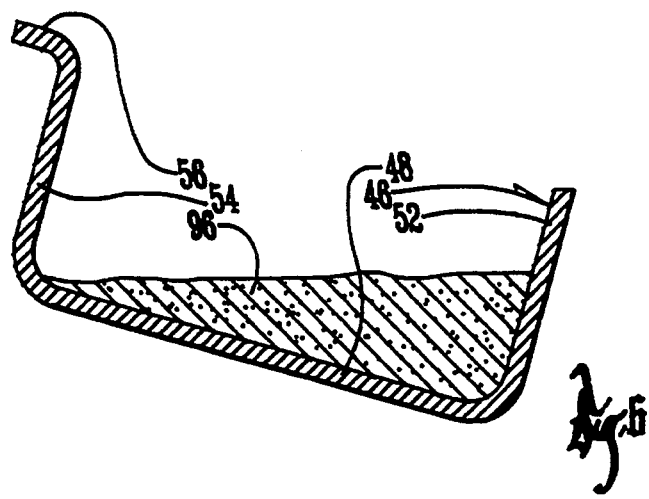

METHOD AND MEANS FOR UNIFORMLY COATING PARTICULATE MATERIAL

BACKGROUND OF THE INVENTION

It has been known for many years to coat small particles, such as seeds and pharmaceutical products. Generally, a coating which increases the weight of the seed up to 25% is defined as a film coating. A coating which increases the weight of the seed more than 25% is referred to as pelletizing. Pelletizing provides uniformity of size to the particles. Depending on the extent of coating applied, pelletizing may provide a spherical shape to the particles which are normally elongated or irregularly shaped.

There are three primary reasons for providing a coating to such particles. First, a protective coating is often applied to seed so as to prevent dust off of prior treatments that have been applied. For example, a film of biological material may be applied to the seed to increase the viability of the seed, and a protective coating is needed to prevent the film from being worn away from the seed during handling. The protective coating allows for a reduction in the amount of film treatment that needs to be applied, thus reducing costs to the seed company. The protective coating also increases the effectiveness of the film treatment by encapsulating the film on the seed. Also, the protective coating reduces environmental hazards of the film treatment.

Another purpose of providing a coating to seeds and small pharmaceutical products is to increase the size of the particle. Particularly for seeds which are too small to be mechanically planted, such an increase in size allows small seeds to be planted mechanically, rather than manually, thereby resulting in significant labor savings, both during the planting and by eliminating manual thinning. Mechanical planting also reduces the seed population required for planting, thereby providing further cost savings.

A third benefit provided by seed coatings is to increase the visibility of the seeds during planting. Therefore, more accurate and less wasteful planting results.

In prior art pelletizing operations, a binder material in a solution was applied by spray, and then a bulking agent, such as clay or wood fibers, was manually applied to the seeds. After the two-step binding and bulking operations were completed, the coated seeds were then taken to an oven to bake dry. Thus, the prior art multiple-step process was slow, time consuming, and labor intensive.

Therefore, a primary objective of the present invention is the provision of an improved method and means for uniformly coating particulate material, such as seeds.

Another objective of the present invention is the provision of a method and means for uniformly coating seeds which coats and dries the seeds in a single step.

A further objective of the present invention is the provision of a method and means for pelletizing seed wherein the binder and bulking agent are applied simultaneously in a solution.

A further objective of the present invention is the provision of a batch pelletizing machine having a tilted drum and side vents for instantaneous drying of the seeds as they are coated.

A further objective of the present invention is the provision of a means for uniformly coating particulate material which is economical to manufacture, and efficient and durable in use.

These and other objectives will become apparent from the following description of the invention.

SUMMARY OF THE INVENTION

A method and means is provided for uniformly coating particulate material, such as seeds. The apparatus includes a cylindrical drum with an axis of rotation tilted with respect to horizontal plane. The drum has a perforated side wall, a lower end closed by an end wall, and a substantially open upper end. The drum is mounted within a housing on a frame, with the angle of tilt of the drum being adjustable. The drum is operatively connected to a motor for rotating the drum about the tilted axis. A spray nozzle extends into the drum for spraying a coating solution onto the particulate material as the drum rotates.

In operation, as the material is coated, it increases in size and weight. Since the drum is tilted, the seeds accumulate adjacent the end wall and along the side wall of the drum. As the drum rotates in a clock wise position, the material is tumbled in the six o'clock-nine o'clock region of the drum and coated with solution from the spray nozzle. Initially, the material forms a dense mass, and as the material is sprayed and increase in size, the larger particles migrate away from the end wall and cannot penetrate the mass of smaller particles adjacent the end wall. Eventually, substantially all of the material is uniformly coated, such that the material forms a new mass wherein the particles are slightly larger than the original mass formed by the uncoated particles. The process repeats itself, such that the particles are coated with additional solution from the spray nozzle, thereby again increasing in size and weight and migrating away from the end wall. This cycle continues until the particles achieve a desired uniform size.

The apparatus also includes a dryer system for substantially instantaneously drying the particles in the drum as they are coated with the solution. The side wall of the drum is perforated, and a flow of heated air is provided into the drum through the apertures for drying the solution on the particles. A vacuum system is also provided on the apparatus for removing the finished coated particles from the drum, without manually handling the particles. Electrical circuitry and a computer or micro-processor are provided for controlling the operation of the apparatus.

BRIEF DESCRIPTION OF THE DRAWINGS

FIG. 1 is a perspective view of the particulate material coating apparatus of the present invention.

FIG. 2 is a sectional view taken along lines 2—2 of FIG. 1.

FIG. 3 is an enlarged partial prospective view of the drum of the apparatus, with particulate material loaded therein.

FIG. 4 is a front sectional view of the drum.

FIG. 5 is a side sectional view of the drum taken along lines 5—5 of FIG. 4, showing the preferred embodiment of the spray nozzle in solid lines and an alternative embodiment of the nozzle in broken lines.

FIG. 6 is a sectional view taken along lines 6—6 of FIG. 3.

FIG. 7 is a perspective view showing the vacuum system for removing coated particulate material from the drum.

DETAILED DESCRIPTION OF THE DRAWINGS

The particulate material coating apparatus of the present invention is generally designated in the drawings by the reference numeral 10. The apparatus includes a housing 12 defined by a front wall 14, a back wall 16, opposite side walls 18, a top wall 20 and a bottom wall 22. Legs 24 support the apparatus 10 on a floor or other support surface. An instrument panel 26 is mounted on one of the side walls, and is operatively connected to electrical circuitry and a computer or micro-processor for controlling the operation of the apparatus, as described below.

Mounted within the housing 12 is a frame 28 which supports a hydraulic cylinder 30. The extensible arm 32 of the cylinder 30 is connected to a support bracket 34. A shaft 36 is rotatably journaled upon the support bracket 34, and includes a pulley 38 on one end thereof. A direct current motor 40 is also mounted upon the support bracket 34, and has an output shaft 42 operatively connected to the shaft 36 by a drive belt 44.

A cylindrical drum 46 is secured to the shaft 36 at an end opposite the pulley 38, such that the drum 46 rotates with the shaft 36. The longitudinal axis of the shaft 36 defines the rotational axis of the drum 46. The drum is movable between a non-operating position, wherein the rotational axis is horizontally disposed as shown in solid lines in FIG. 2, and an inclined or tilted operational position, wherein the rotational axis is angled upwardly from a horizontal plane, as shown by broken lines in FIG. 2. The degree of tilt ranges between 0–18 degrees, as controlled by actuation of the hydraulic cylinder 30.

The drum 46 includes a perforated side wall 48 having a plurality of apertures 50 therein. The drum has an end wall 52 which closes the back or lower end of the drum, and an annular front end wall 54. The front wall 54 includes an enlarged opening 56 which is aligned with a door 58 in the front wall 14 of the apparatus 10 when the drum is in the horizontal non-operating position, so as to provide access to the interior of the drum 46. Thus, the front end of the drum is substantially open for loading and removing particulate material into and from the drum. When the door 58 is closed, the drum 46 is sealed, so that a negative pressure can be maintained therein during the coating process.

Apparatus 10 includes a drying system for drying the seeds in the drum 46 as the seeds are coated. More particularly, as best seen in FIG. 4, the drying system includes a stationary shroud 60 which extends around the drum 46. The shroud pivots with the drum, but does not rotate with the drum. An air inlet plenum 62 is operatively connected to a source of air, including a blower (not shown) and a heater (not shown), and extends through a portion of the shroud 60 for introducing air into the drum 46 through perforations 50. An air outlet plenum 64 extends through a portion of the shroud 60 opposite the plenum 62, and is operatively connected to a blower (not shown) for exhausting air from the drum. A damper (not shown) is provided in the exhaust plenum 64. A dust collector system 67 is operatively connected to the exhaust plenum 64. The dust collector 67 includes a filter 69 for collecting dust and over-spray, and is vented to the atmosphere.

A spray nozzle 70 extends into the drum 46. Preferably, nozzle 70 is a pneumatic atomizing spray gun having a needle which moves back and forth to control spray of a coating solution from the nozzle. In one preferred embodiment, as seen in solid lines in FIGS. 5, the shaft 36 is hollow, and the hose or conduit 72 for supplying liquid coating solution to the nozzle 70 extends through the hollow shaft. In an alternative embodiment, shown in broken lines in FIG. 5, the spray nozzle 70 is mounted upon an arm 74 extending through the opening 56 in the front end of the drum. A hose 76 extends along the support arm 74 to supply coating solution to the spray nozzle 70.

A second nozzle 77 is mounted adjacent the nozzle 70 and is operatively connected to a water line 79 for cleaning the drum 46 after the coating process is completed.

A vacuum system 80 is provided for removing coated particulate material from the drum 46. The vacuum system 80 includes a hopper or tray 82 having a removable lid 84 slideably mounted thereon. A first vacuum line 86 is operatively connected to the exhaust blower (not shown) so as to create a vacuum in the hopper 82. A second line 88 extends from the hopper for manual insertion into the drum 46 after the coating process is complete, for vacuuming coated particulate material from the drum. A slide gate 90 is mounted on the lid 84 and is movable between open and closed positions, to control actuation of the vacuum system 80. The vacuum system 80 is mounted on the housing 12 below the instrument panel 26, as seen in FIG. 1.

In operation, the door 58 is opened on the front wall 14 of the housing 12, and a quantity of particulate material, such as seeds, is manually loaded into the drum 46 through the opening 56. The door 58 is then closed and the hydraulic cylinder 30 is actuated so as to retract the arm 32 and thereby tilt the rotational axis of the drum to the desired degree of elevation between 0°–18° above a horizontal line or plane. With such tilting of the drum, the seeds 96 tend to accumulate against the back wall 52 and side wall 48 of the drum, as seen in FIGS. 5 and 6. The motor 40 is then actuated so as to rotate the shaft 36 and the drum 46 about the rotational axis defined by the longitudinal axis of the shaft 36 at approximately 32–40 RPM.

Rotation of the drum in a clockwise direction causes the seeds 96 to tumble within the drum, generally between the six o'clock and nine o'clock positions, as seen in FIG. 4. The spray nozzle 70 is then actuated so as to supply a spray of coating solution onto the seeds 96. The solution preferably includes both a binder and a bulking agent, such that the coated seeds increase in size and weight. The spray from the nozzle 70 is directed rearwardly towards the back end wall 54 so as to coat a portion of the seeds contained within the drum.

Initially, the seeds form a dense mass. As the seeds become coated with the solution from the spray nozzle 70, the increased size of the coated seeds cause those enlarged seeds to migrate away from the end wall 52, due to the centrifugal force of the rotating drum. Such enlarged seeds also will not reenter or penetrate the dense mass of smaller uncoated seeds. Thus, eventually, all of the seeds are coated to a substantially uniform size by the spray solution from the nozzle 70, which is directed at the mass. The seeds then form a new dense mass and the process is repeated. This cycle continues until the seeds are coated to a desired size. With this process, the seeds are coated to a uniform size as they migrate in and out of the path of the spray nozzle.

As the seeds are coated with the solution sprayed through the nozzle 70, the drying system is actuated so that the solution is substantially instantaneously dried on the seeds. More particularly, air is forced through the apertures of the drum 46, preferably at a temperature of approximately 150° F., and exhausted from the drum at an approximate temperature of 90° F. The seeds maintain a substantially constant temperature of 83° F., thereby avoiding any deterioration or damage to the seed or to biological ingredients in the coating solution. Also, actuation of the drying system creates a negative pressure within the drum.

After the seeds have reached the desired uniform size, the suction line 88 is manually inserted into the drum 46 through opening 56, and the vacuum system 80 is actuated so as to remove the seeds from the drum 46 without manual handling of the seeds. When the vacuum system is actuated, the seeds are sucked into the second line 88 and deposited in the hopper 82. When all of the seeds are removed from the drum, the hopper 82 can be removed from the housing 12 and the seeds packaged or stored in any convenient manner.

Preferably, a computer or micro-processor is employed for controlling the operation of the apparatus 10. For example, a computer may be utilized for controlling the electrical power to the apparatus, the tilting angle and rotation of the drum 46, the spraying function of nozzle 70, the air flow and temperature in the drying system, and the operation of the vacuum system 80.

The computer is operatively connected to the instrument panel 26 which has the appropriate electrical circuitry, control buttons and indicator lights, so that a person can start and stop the various functions of the apparatus 10, and monitor its operation. The sequence of operational functions of the apparatus 10, as controlled by the computer program and electrical circuitry, is as follows.

First, the power is turned on for activating the control panel 26. The drum angle is set at a desired orientation, depending on the product being coated, and the size, density and quantity of the product. The pump (not shown) for providing the spray solution to the nozzle 70 is then activated. Preferably, if there is solution in the lines, the pump should be running at all times.

Next, the exhaust blower connected to the outlet plenum 64 is actuated so as to create a negative pressure on the side-vented drum 46. Instrumentation on the control panel 26, such as a light, indicates when the exhaust blower is on. The inlet blower connected to the inlet plenum 62 is then actuated, so as to force air through the apertures 50 to the inside of the drum 46. The heater for the inlet air is activated after the inlet blower is turned on. The heater may be either an indirect gas-fire heater or an electric heater.

The temperature for the process is then set, depending on the product being coated. Different products require different temperatures. A temperature sensor and controller is provided, and preferably operates on a 4-20 milliamp signal or on an on/off solenoid. The process is set to run at a specific inlet temperature, and the product is maintained at the desired temperature as it is sprayed with the coating solution.

Before product is loaded into the drum, the rotational drive for the drum is activated. The rotational speed of the drum varies, depending on the size of the product being coated. A typical drum speed is 36 rpm.

The dust collection system is then activated so as to cause a pulse air jet to clean the filter which collects over-spray from the nozzle 70 as the coating process runs.

After the above-described startup steps have been commenced, the product to be coated is loaded into the drum 46. The product is not loaded sooner, since it is preferable to have the heater come up to the desired temperature without pre-heating the product. Once the desired temperature set point has been reached, as indicated on a digital readout on the control panel 26, and the solution pump rate is set, also as indicated on a digital readout on the control panel 26, the spray nozzle 70 is activated. Preferably, during the pelletizing process, the flow rate of the spray solution starts out very low, and as the pellet gets larger, the flow rate is increased.

After the product being coated has reached the desired size, a button on the control panel 26 is pushed to turn off the spray of solution from nozzle 70. A second button is then pushed to turn off the air heater, so as to prevent over-heating of the product that has been coated. Preferably, the inlet blower is allowed to run for several minutes after the heat is turned off so as to help dispense heat from the housing 12. The dust collector is then turned off, while the exhaust blower continues to run. The product is allowed to cool. The quickest way to cool the product is to open the front door 58, such that ambient air cools the product to ambient temperature. The rotational speed of the drum is reduced while the product is cooling, so as to prevent the coating from being worn off the product.

After the product has cooled, the vacuum system 80 is actuated with a button on the control panel 26. Activation of the vacuum system closes a damper (not shown) on the exhaust plenum 64, such that the slide gate 90 can be opened and hose 88 used for vacuuming the product into the tray 82.

After the vacuuming is completed, the exhaust blower is shut off with a push button on the control panel 26. Another button on the control panel 26 is then pushed to activate a cleaning system, which sprays a jet of water at approximately 40-60 psi into the drum 46 so as to clean the inside of the drum. A drain system (not shown) is provided in the housing 12 for collecting the cleaning water. Particularly heavy deposits on the inside of the drum may be cleaned by hand scrubbing while the water is being sprayed into the drum. When cleaning is completed, the cleaning system is turned off, and the inlet blower is activated to dry the inside of the drum. The exhaust blower should not be operated after the cleaning cycle, so as prevent damage to the dust filter. The heater may also be actuated to further facilitate drying of the drum 46 after cleaning. The heater and the inlet blower are then turned off. The apparatus 10 is then ready for the next coating process.

Whereas the invention has been shown and described in connection with the preferred embodiments thereof, it will be understood that many modifications, substitutes and additions may be made which are within the intended broad scope of the following claims. From the foregoing, it can be seen that the present invention accomplishes at least all of the stated objectives.

What is claimed is:

1. An apparatus for uniformly coating particulate material, comprising:

a support frame;

a cylindrical drum having an axis of rotation mounted on the support frame with the axis of rotation being tilted with respect to a horizontal line and having a lower end and an upper end;

tilting means for selectively tilting the drum at various angles above the horizontal line;

the drum having a side wall, and an end wall connected to the side wall at the lower end of the axis, with the end of the drum opposite to the end wall being substantially open;

rotation means on the frame for rotating the drum at variable speeds about the axis for causing particulate material to movably congregate against adjacent portions of the side wall and the end wall;

a stationary nozzle means extending into the drum for spraying coating material on particulate material in the drum;

the side wall of the drum including a plurality of perforations through which air passes for drying the coating material on the particulate material in the drum; and vacuum means extensible into the drum for removing particulate material from the drum after the particulate material has been coated.

2. The apparatus of claim 1 further comprising a shroud extending around the side wall of the drum, the shroud having an air inlet opening connected to a source of air for supplying air to the drum, and an air outlet for exhausting air from the drum.

3. The apparatus of claim 1 further comprising air supply means for supplying air into the drum so as to dry the particulate material within the drum after the coating material is applied.

4. The apparatus of claim 1 wherein the nozzle means extends through the end wall of the drum.

5. The apparatus of claim 1 wherein the nozzle means extends through the open end of the drum.

6. The apparatus of claim 1 wherein the drum is mounted on a rotatable hollow shaft, and the nozzle means extends through the shaft into the drum.

7. An apparatus for coating particulate material, comprising:

a support frame;

a cylindrical drum rotatably mounted on the frame with an axis of rotation tilted with respect to a horizontal plane, the drum having a perforated side wall, a lower end wall, and a substantially open end opposite the end wall;

tilting means for tilting the drum to various angled positions above the horizontal plane;

a spray nozzle positioned within the drum for spraying a coating solution onto particulate material in the drum;

variable speed rotation means on the frame for rotating the drum at variable speeds;

drying means for supplying air through the perforations of the side wall of the drum so as to dry the coating solution as the particulate material is coated; and vacuum means for vacuuming coated material from the drum.

8. The apparatus of claim 7 wherein the drying means includes an air inlet operatively connected to a source of air to supply air into the drum, and an air outlet for removing air from the drum.

9. The apparatus of claim 7 wherein the spray nozzle extends through the end wall of the drum.

10. The apparatus of claim 7 wherein the spray nozzle extends through the open end of the drum.

11. The apparatus of claim 7 wherein the drum is mounted on a shaft operatively connected to the rotation means such that actuation of the rotation means rotates the shaft and the drum.

12. The apparatus of claim 11 wherein the shaft defines the axis of rotation of the drum, and a hydraulic cylinder is operatively connected to the shaft for changing the tilt of the axis.

13. The apparatus of claim 1 further comprising heat means for selectively heating the drum to various temperatures.

14. The apparatus of claim 7 further comprising a second nozzle for spraying a cleaning substance into the drum for cleaning the drum.

* * * * *